United States Patent
Laminette et al.

(10) Patent No.: US 10,801,687 B2
(45) Date of Patent: Oct. 13, 2020

(54) BI-FUNCTIONAL LIGHT MODULE WITH COMMON ILLUMINATED SURFACE

(71) Applicant: VALEO VISION, Bobigny (FR)

(72) Inventors: Maxime Laminette, Angers (FR); Jean-Francois Doha, Angers (FR); Sylvain Giraud, Angers (FR); Lionel Floc'h, Seymour, IN (US)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/263,481

(22) Filed: Jan. 31, 2019

(65) Prior Publication Data
US 2019/0234575 A1 Aug. 1, 2019

(30) Foreign Application Priority Data
Jan. 31, 2018 (FR) ...................... 18 50804

(51) Int. Cl.
| | |
|---|---|
| *F21S 41/32* | (2018.01) |
| *F21S 41/365* | (2018.01) |
| *F21S 41/43* | (2018.01) |
| *B60Q 1/04* | (2006.01) |
| *F21S 41/147* | (2018.01) |
| *F21S 43/31* | (2018.01) |

(52) U.S. Cl.
CPC .............. *F21S 41/321* (2018.01); *B60Q 1/04* (2013.01); *F21S 41/147* (2018.01); *F21S 41/365* (2018.01); *F21S 41/43* (2018.01); *F21S 43/31* (2018.01)

(58) Field of Classification Search
CPC ........ B60Q 1/04; F21S 41/321; F21S 41/365; F21S 41/43; F21S 43/31
See application file for complete search history.

(56) References Cited

U.S. PATENT DOCUMENTS

| | | | |
|---|---|---|---|
| 2004/0130907 A1* | 7/2004 | Albou | ..................... F21V 13/10 362/517 |
| 2005/0094402 A1 | 5/2005 | Albou | |
| 2008/0137358 A1 | 6/2008 | Albou | |
| (Continued) | | | |

FOREIGN PATENT DOCUMENTS

| | | |
|---|---|---|
| EP | 1 528 312 A1 | 5/2005 |
| EP | 2 366 938 A1 | 9/2011 |

OTHER PUBLICATIONS

French Preliminary Search Report dated Oct. 3, 2018 in French Application 18 50804, filed on Jan. 31, 2018 (with English Translation of Categories of Cited Documents).

*Primary Examiner* — Tsion Tumebo
(74) *Attorney, Agent, or Firm* — Oblon, McClelland, Maier & Neustadt, L.L.P.

(57) ABSTRACT

A light module, notably for a motor vehicle, including a first reflecting surface), of the elliptical type, with a first focus and a second focus; a second reflecting surface, of the parabolic type, with a focus corresponding to the second focus of the first reflecting surface; light rays emitted by a first light source located at the first focus of the first reflecting surface being reflected by the first and second reflecting surfaces to form a first light beam; and a third reflecting surface adjacent to the second focus of the first reflecting surface and configured to reflect, towards the second reflecting surface, light rays emitted by a second light source, in order to form a second light beam.

19 Claims, 3 Drawing Sheets

(56) References Cited

U.S. PATENT DOCUMENTS

| | | | | |
|---|---|---|---|---|
| 2009/0284980 A1* | 11/2009 | Iwasaki | ............... | F21S 41/43 |
| | | | | 362/517 |
| 2011/0211361 A1 | 9/2011 | Kawamura | | |
| 2012/0262935 A1* | 10/2012 | Yamamoto | ............ | B60Q 1/14 |
| | | | | 362/516 |
| 2013/0188378 A1* | 7/2013 | Yamamoto | ............ | F21V 13/04 |
| | | | | 362/512 |
| 2013/0201713 A1* | 8/2013 | Suzuki | ............... | B60Q 1/04 |
| | | | | 362/516 |
| 2015/0219301 A1* | 8/2015 | Honda | ............... | F21S 41/255 |
| | | | | 362/517 |

* cited by examiner

BI-FUNCTIONAL LIGHT MODULE WITH COMMON ILLUMINATED SURFACE

The invention relates to the field of lighting and light signalling, notably for motor vehicles.

The published patent document FR 2 849 158 A1 discloses an illumination module for a vehicle headlight, essentially comprising a first reflecting surface of the elliptical type with a first and a second focus, and a second reflecting surface of the parabolic type with a focus corresponding to the second focus of the first reflecting surface. The light rays emitted by a light source located at the first focus of the first reflecting surface are reflected towards the second reflecting surface, passing through the second focus. These rays are then reflected in the same direction by this second reflecting surface of the parabolic type. The module further comprises a generally flat reflecting surface with a cutting edge passing through the second focus. The light rays encountering this surface near the second focus are then reflected towards the second reflecting surface at angles of incidence such that these rays are reflected towards the bottom of the light beam. Thus this beam has a cut-off generated by the cutting edge and the reflecting surface adjacent to said edge.

This type of light module is useful in that it can provide a lighting function without the light source being visible from outside the module, since only the second reflecting surface is visible from the outside. However, there are some functions that this module cannot provide.

The object of the invention is to overcome at least one drawback of the aforementioned prior art. More particularly, the object of the invention is to propose a light module that provides a plurality of functions and has the same appearance in each function.

The invention proposes a light module, notably for a motor vehicle, comprising a first reflecting surface of the elliptical type, with a first focus and a second focus; a second reflecting surface of the parabolic type, with a focus corresponding to the second focus of the first reflecting surface; light rays emitted by a first light source located at the first focus of the first reflecting surface being reflected by the first and second reflecting surfaces to form a first light beam, and is remarkable in that the module further comprises a third reflecting surface adjacent to the second focus of the first reflecting surface and configured to reflect, towards the second reflecting surface, light rays emitted by a second light source, in order to form a second light beam.

The expression "elliptical" is applied in a general way to reflectors whose surface has two foci, that is to say two areas of convergence of the light rays such that the light rays emitted by a light source placed in one of the two areas of convergence converge, after reflection from the surface, towards the other area of convergence. These two foci are located near said surface, that is to say within a volume having dimensions less than 10 times, and notably less than 5 times, as great as the dimensions of the reflector. Therefore an elliptical surface may or may not have elliptical portions. A reflector having such a surface is usually associated, for creating a light beam, with an optical projection component, for example a lens or parabolic reflector.

The expression "parabolic" is applied in a general way to reflectors whose surface has only one focus, that is to say an area of convergence of the light rays such that the light rays emitted by a light source placed in this area of convergence are projected over a long distance after reflection from the surface. "Projected over a long distance" signifies that these light rays do not converge towards an area located at a distance of less than 10 times the dimensions of the reflector. In other words, the reflected rays do not converge towards an area of convergence, or, if they do converge, this area of convergence is located at a distance greater than or equal to 10 times the dimensions of the reflector. Therefore a parabolic surface may or may not have parabolic portions. A reflector having such a surface is normally used on its own for creating a light beam. Alternatively, it may be used as a projection surface associated with an elliptical reflector. In this case, the light source of the parabolic reflector is the area of convergence of the rays reflected by the elliptical reflector.

According to an advantageous embodiment of the invention, the module comprises an optical system configured to make the light rays emitted by the second light source converge towards the third reflecting surface.

According to an advantageous embodiment of the invention, the optical system comprises a fourth reflecting surface of the elliptical type, with a first focus at which the second light source is to be placed, and a second focus.

According to an advantageous embodiment of the invention, the second focus of the fourth reflecting surface is located behind the third reflecting surface.

According to an advantageous embodiment of the invention, the first and fourth reflecting surfaces each form a half-shell delimited by a plane on which one of the first and second light sources, respectively, is to be positioned.

According to an advantageous embodiment of the invention, the two planes delimiting the first and fourth reflecting surfaces form an angle $\alpha$ of more than 68° and/or less than 98°.

According to an advantageous embodiment of the invention, the second reflecting surface is supported by the fourth reflecting surface. More particularly, the second reflecting surface is formed by a reflector rigidly connected to a reflector forming the fourth reflecting surface.

According to an advantageous embodiment of the invention, said module comprises a cutting edge at the second focus of the first reflecting surface.

According to an advantageous embodiment of the invention, the cutting edge and the third reflecting surface are formed on a common support.

According to an advantageous embodiment of the invention, the common support of the cutting edge and the third reflecting surface is elongated along the cutting edge and has a bevelled cross section.

According to an advantageous embodiment of the invention, the first and second light beams have a common direction.

According to an advantageous embodiment of the invention, the first and second light beams each have a maximum intensity, the angular offset between the two maxima being less than or equal to 3°, and preferably less than or equal to 2°.

According to an advantageous embodiment of the invention, the third reflecting surface extends along a longitudinal direction which is transverse to the first and second light beams, the cross section of said surface having a straight, concave or convex profile.

According to an advantageous embodiment of the invention, the third reflecting surface has a straight, concave or convex longitudinal profile.

According to an advantageous embodiment of the invention, the first light beam is a cut-off motor vehicle light beam of the low beam type, and/or the second light beam, combined with the first beam, is a motor vehicle light beam of the high beam type.

The invention also proposes an illumination and/or light signalling device, notably for a motor vehicle, comprising at least one illumination module, remarkable in that the illumination module, or at least one of the illumination modules, conforms to the invention.

The methods of the invention are useful in that they may be used to provide a bi-functional light module with an illuminated surface visible from the outside, which has the same illuminated appearance in both lighting functions. It is particularly suitable for providing lighting functions of the "low beam" and "high beam" type. However, it would also be feasible to provide other functions, notably light signalling functions, such as daytime running light (DRL) and direction indicator (more commonly called "turn signal") functions.

Other characteristics and advantages of the present invention will be more clearly understood with the aid of the description and the figures, in which.

Figure 1:
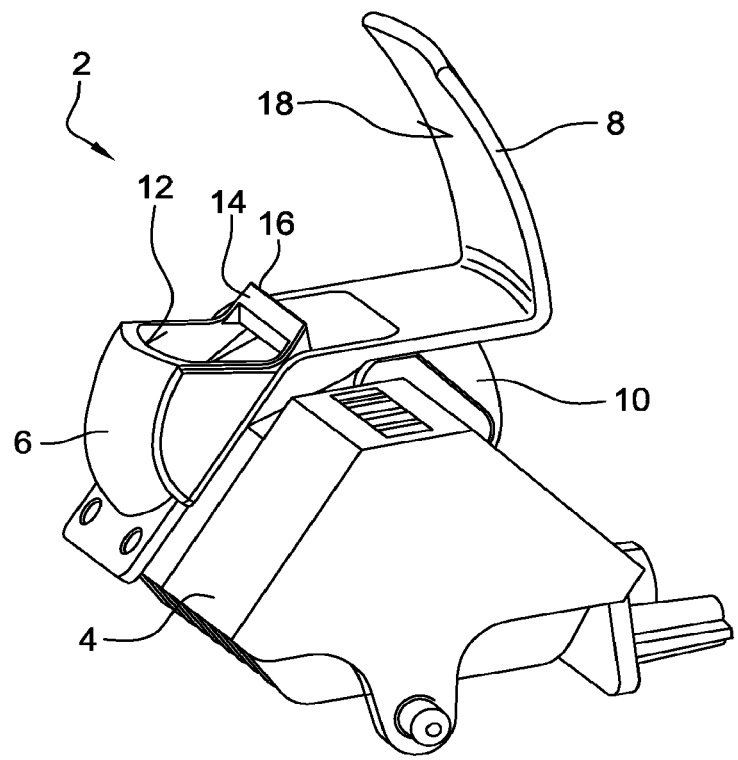
FIG. 1 is a perspective representation of a light module according to the invention.

FIG. 1 is a perspective view of a light module according to the invention. The light module 2 essentially comprises a support 4, a first reflector 6, a second reflector 8 and a third reflector 10.

The first reflector 6 forms a first reflecting surface 12 of the elliptical type. More particularly, this reflecting surface 12 forms an elliptical dome. The first reflector 6 may also comprise lateral walls extending to a transverse support 14 comprising a cutting edge 16. More precisely, the cutting edge 16 in question is located at the second focus of the first reflecting surface 12.

The second reflector 8 forms a second reflecting surface 18. This advantageously forms a parabolic dome with a focus coinciding with the second focus of the first reflecting surface 12.

The third reflector 10, located below the second reflector 8, forms an elliptical reflecting surface, in a similar way to the first reflector 6.

Figure 2:
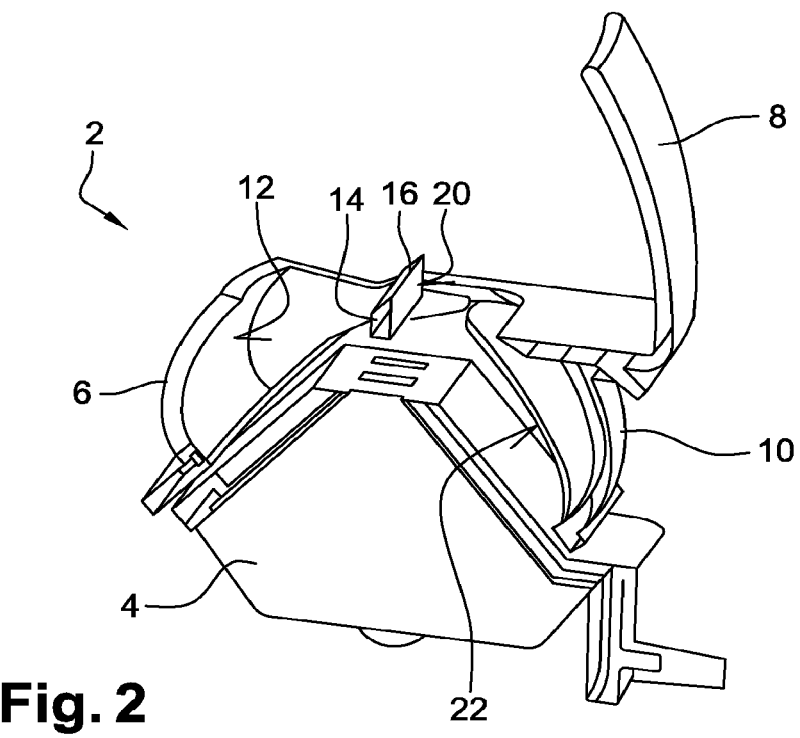
FIG. 2 is a sectional view of the light module of FIG. 2.

FIG. 2 is a cross-sectional view of the light module of FIG. 2 from another viewpoint, the section being taken through the middle of the three reflectors of the module. It can be seen that the transverse support 14 comprising the cutting edge 16 also forms a third reflecting surface 20 designed to reflect towards the second reflector 8 the light rays emitted by a light source and reflected by the reflecting surface 22 of the third reflector, this reflecting surface 22 then forming a fourth reflecting surface of the light module.

Figure 3:
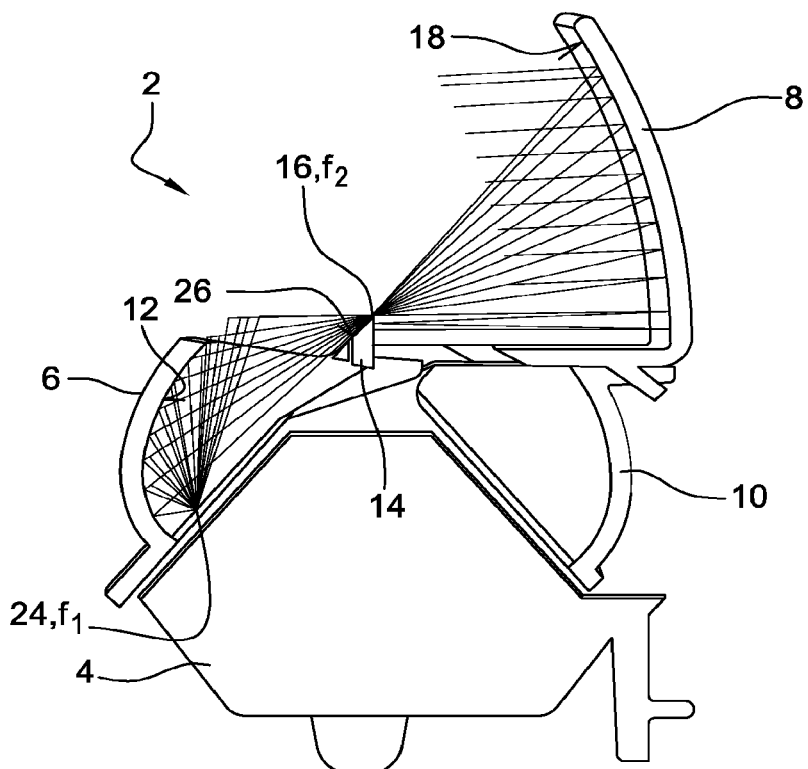
FIG. 3 is a sectional view of the light module of FIG. 1, showing the rays forming a first light beam.

FIG. 3 is a cross-sectional and plan view of the light module of FIGS. 1 and 2, showing the path of the rays reflected by the first and second reflectors. A first light source 24 is represented schematically by a point at the position of the first focus $f_1$ of the first reflecting surface 12 on the first reflector 8, although it should be understood that this light source is not necessarily a point source, and may therefore have a degree of extension. As may be seen in FIG. 3, the rays emitted by the first light source 24 are reflected by the first reflecting surface 12 towards the second reflecting surface 18, passing through the second focus $f_2$ located at the cutting edge 16 on the transverse support. These rays are then reflected in the same direction by the second reflecting surface 18, to form a first light beam.

The presence of the cutting edge 16 causes the resulting light beam, in this case the first light beam, to have a cut-off whose profile corresponds to that of said edge. This is because those of the light rays emitted by the light source 24 and reflected by the reflecting surface 12 which encounter the transverse element 14 at its surface 26 are absorbed, or reflected if this surface is reflective. In other words, in the absence of the cutting edge 16 these rays would be transmitted to the second reflecting surface 18 at a higher angle of incidence, and would then be reflected towards the top of the light beam. It should be noted that the general principle of a cutting edge is known to those skilled in the art.

It should be noted that the presence of the cutting edge 16 is optional. In fact, it would be feasible for the first light beam to have no cut-off.

Figure 4:
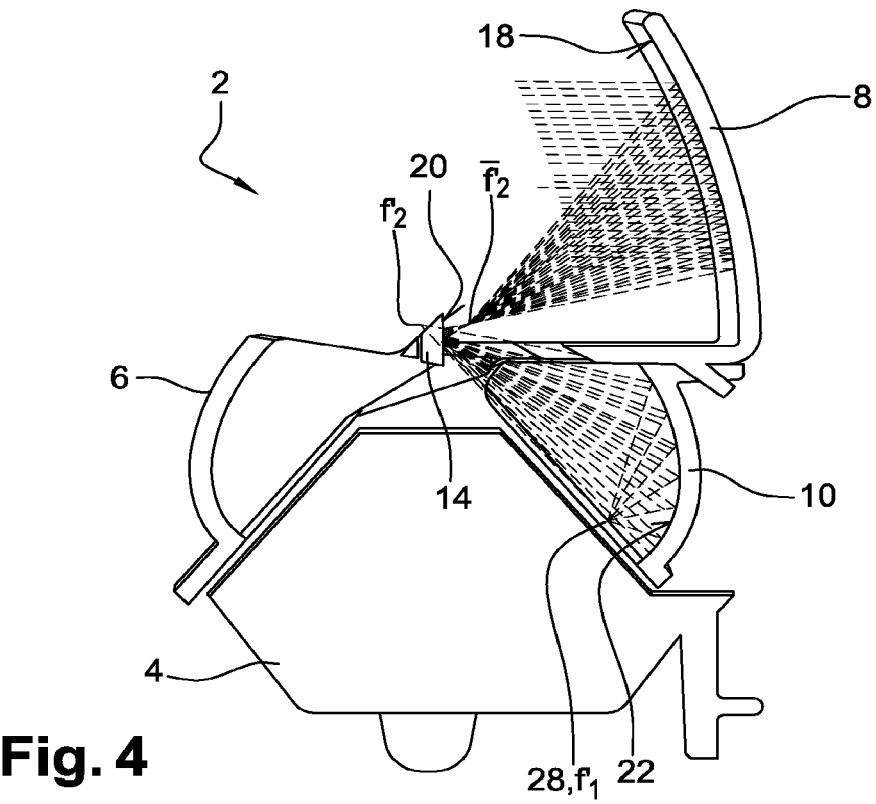
FIG. 4 is a sectional view of the light module of FIG. 1, showing the rays forming a second light beam.

FIG. 4 is a cross-sectional and plan view of the light module of FIGS. 1 and 2, similar to FIG. 3 but showing the path of the rays reflected by the third and second reflectors. A second light source 28 is represented schematically by a point at the position of the first focus $f'_1$ of the fourth reflecting surface 22 on the third reflector 10, although it should be understood that this light source is not necessarily a point source, and may therefore have a degree of extension. As may be seen in FIG. 4, the rays emitted by the second light source 28 are reflected by the fourth reflecting surface 22 towards the third reflecting surface 20. More precisely, these rays converge towards the second focus $f'_2$ of the fourth reflecting surface 22, although in this case this focus is located behind the third reflecting surface 20, that is to say on the opposite side of the third reflecting surface from the first focus $f'_1$ of the fourth reflecting surface. These rays are then reflected by this surface towards the second reflecting surface 18, passing through a point $\overline{f}'_2$ which is the conjugate of the second focus $f'_2$ with respect to the third reflecting surface 20. These rays are then transmitted to the second reflecting surface 18 where they are reflected to form a second light beam.

It should be noted that the third reflecting surface 20 is advantageously flat, as shown in the figures. However, this surface may have a concave or convex profile. This surface advantageously extends in a longitudinal direction which is transverse to the directions of the first and second lighting beams. The cross section of the surface in question may be constant along this longitudinal direction, or may vary.

The convexity or concavity may thus be present in a cross section and/or in a longitudinal section of the surface in question.

It should also be noted that the configuration of the third reflecting surface 20 may depend on the configuration of the incident light beam. Accordingly, it would be feasible to use an optical system other than that of the third reflector 10 of the elliptical type.

Figure 5:
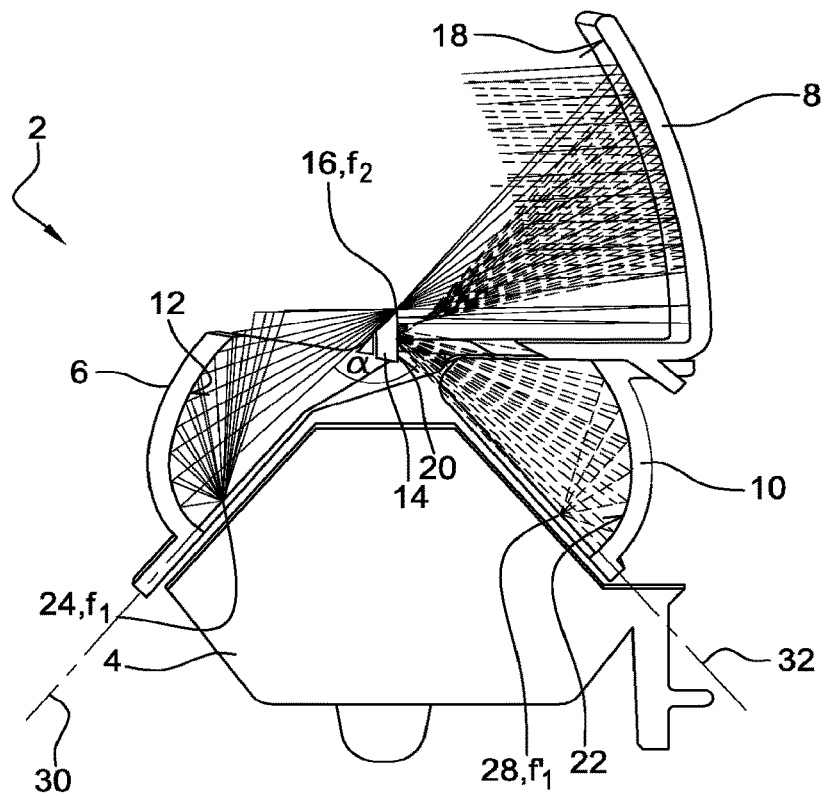
FIG. 5 is a sectional view of the light module of FIG. 1, showing the rays forming the first and second light beams.

FIG. 5 is a cross-sectional and plan view of the light module of FIGS. 1 and 2, similar to FIGS. 3 and 4, but showing the path of the rays emitted by the first and second light sources. In other words, FIG. 5 is a combination of FIGS. 3 and 4. The superimposition or combination of the first and second light beams may be observed when the first and second light sources are illuminated concurrently. More specifically, in this case, it may be seen that the rays emitted by the second light source 28 are reflected by the third reflecting surface 20 in such a way that they have greater angles of incidence than those of the rays originating from the first light source 24. They will thus be reflected farther towards the top of the resulting light beam.

Also with reference to FIG. 5, it is useful to note the angle α formed by the planes 30 and 32 corresponding to the respective optical axes of the first and second reflectors. The angle α is advantageously greater than 68° and/or smaller than 98°, yet more advantageously greater than 73° and/or smaller than 83°, or yet more advantageously of the order of 78°. This angle may, notably, depend on the definition of the second reflecting surface 18 of the parabolic type.

The first light beam originating from the first light source 24 is advantageously a cut-off lighting beam for a motor vehicle (commonly called "low beam" in English). The light beam originating from the second light source 28 is advantageously a lighting beam for a motor vehicle which completes the first beam to form a motor vehicle lighting beam commonly called a "main beam" ("high beam" in English).

When the first beam is active, and also when the second beam is active, on its own or in combination with the first beam, the second reflecting surface 18 is illuminated. This means that the illuminated appearance of the module as seen from the outside is essentially the same, independently of the function that is active.

Figure 6:
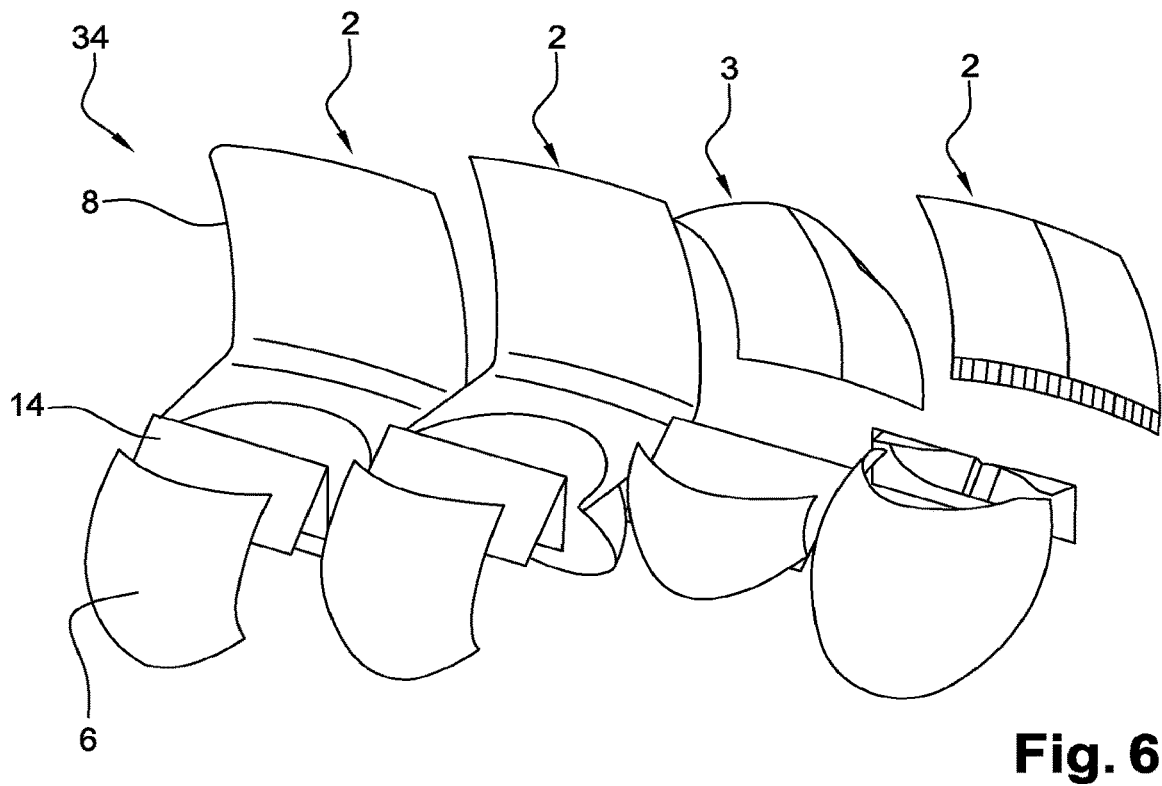
FIG. 6 is a representation of four light modules forming a lighting device, two of said modules being in accordance with the invention.

FIG. 6 shows, in a somewhat schematic manner, a light device 34, in this case a motor vehicle headlight consisting of four light modules, two of which are bi-functional modules 2 conforming to those of FIGS. 1 to 5, while two others are mono-functional modules 3. By way of example, a first lighting function of the "low beam" type is provided when the four modules are illuminated and a second lighting function of the "high beam" type is provided when the second light sources of the modules 2 are additionally illuminated.

The invention claimed is:

1. A light module for a motor vehicle, the light module comprising:
   a first reflecting surface, of an elliptical type, with a first focus and a second focus;
   a second reflecting surface, of a parabolic type, with a focus corresponding to the second focus of the first reflecting surface;
   light rays emitted by a first light source located at the first focus of the first reflecting surface being reflected by the first and second reflecting surfaces to form a first light beam;
   a third reflecting surface adjacent to the second focus of the first reflecting surface and configured to reflect, towards the second reflecting surface, light rays emitted by a second light source, in order to form a second light beam; and
   an optical system configured to make the light rays emitted by the second light source converge towards the third reflecting surface.

2. The light module according to claim 1, wherein the optical system comprises a fourth reflecting surface of the elliptical type, with a first focus, at which the second light source is to be placed, and a second focus.

3. The light module according to claim 2, wherein the second focus of the fourth reflecting surface is located behind the third reflecting surface.

4. The light module according to claim 2, wherein the first and fourth reflecting surfaces each form a half-shell delimited by a plane on which one of the first and second light sources, respectively, is to be positioned.

5. The light module according to claim 4, wherein the two planes delimiting the first and fourth reflecting surfaces form an angle α of more than 68° and/or less than 98°.

6. The light module according to claim 2, wherein the second reflecting surface is supported by the fourth reflecting surface.

7. The light module according to claim 1, wherein the first and second light beams have a common direction.

8. The light module according to claim 1, wherein the third reflecting surface extends in a longitudinal direction which is transverse to the first and second light beams, a cross section of said surface having a straight, concave or convex profile.

9. The light module according to claim 8, wherein the third reflecting surface has a straight, concave or convex longitudinal profile.

10. The light module according to claim 1, wherein the first light beam is a cut-off motor vehicle light beam of a low beam type, and/or the second light beam, combined with the first beam, is a motor vehicle light beam of a high beam type.

11. A lighting and/or light signaling device for a motor vehicle, the lighting and/or signaling device comprising:
    a plurality of light modules, at least one of the plurality of light modules being the light module according to claim 1.

12. The light module according to claim 3, wherein the first and fourth reflecting surfaces each form a half-shell delimited by a plane on which one of the first and second light sources, respectively, is to be positioned.

13. The light module according to claim 3, wherein the second reflecting surface is supported by the fourth reflecting surface.

14. The light module according to claim 1, further comprising a cutting edge at the second focus of the first reflecting surface.

15. A light module comprising:
    a first reflecting surface, of an elliptical type, with a first focus and a second focus;
    a second reflecting surface, of a parabolic type, with a focus corresponding to the second focus of the first reflecting surface;
    light rays emitted by a first light source located at the first focus of the first reflecting surface being reflected by the first and second reflecting surfaces to form a first light beam;
    a third reflecting surface adjacent to the second focus of the first reflecting surface and configured to reflect, towards the second reflecting surface, light rays emitted by a second light source, in order to form a second light beam; and
    a cutting edge at the second focus of the first reflecting surface.

16. The light module according to claim 15, wherein the cutting edge and the third reflecting surface are formed on a common support.

17. The light module according to claim 16, wherein the common support of the cutting edge and of the third reflecting surface is elongated along said edge and has a beveled cross section.

18. The light module according to claim 15, wherein the first and second light beams have a common direction.

19. The light module according to claim 15, wherein the third reflecting surface extends in a longitudinal direction which is transverse to the first and second light beams, a cross section of said surface having a straight, concave or convex profile.

* * * * *